United States Patent
Fujimori et al.

(10) Patent No.: US 6,751,057 B2
(45) Date of Patent: Jun. 15, 2004

(54) MAGNETIC RECORDING/REPRODUCING APPARATUS AND ROTARY HEAD DRUM DEVICE

(75) Inventors: Motoyoshi Fujimori, Chiba (JP); Ichiro Hashimoto, Kanagawa (JP); Akira Itou, Tokyo (JP)

(73) Assignee: Sony Corporation, Tokyo (JP)

( * ) Notice: Subject to any disclaimer, the term of this patent is extended or adjusted under 35 U.S.C. 154(b) by 153 days.

(21) Appl. No.: 10/057,551

(22) Filed: Jan. 25, 2002

(65) Prior Publication Data

US 2002/0109945 A1 Aug. 15, 2002

(30) Foreign Application Priority Data

Jan. 26, 2001 (JP) ...................... P2001-018750

(51) Int. Cl.$^7$ .............................................. G11B 15/62
(52) U.S. Cl. ..................... 360/130.24; 360/84; 360/128
(58) Field of Search ............................. 360/84, 130.24, 360/130.23, 130.22, 128, 271.1, 271.6; 242/358

(56) References Cited

U.S. PATENT DOCUMENTS

| 4,723,182 | A | * | 2/1988 | Nakanishi | 360/85 |
| 5,535,070 | A | * | 7/1996 | Choi | 360/84 |
| 6,452,744 | B1 | * | 9/2002 | Tamaru et al. | 360/130.24 |

FOREIGN PATENT DOCUMENTS

| JP | 52023908 A | * | 2/1977 | ........... G11B/15/60 |
| JP | 01296451 A | * | 11/1989 | ........... G11B/15/61 |
| JP | 03198248 A | * | 8/1991 | ........... G11B/15/61 |
| JP | 04195846 A | * | 7/1992 | ........... G11B/15/61 |
| JP | 08106775 A | * | 4/1996 | ........... G11B/33/14 |
| JP | 10255354 A | * | 9/1998 | ........... G11B/15/61 |
| JP | 2000251352 A | * | 9/2000 | ........... G11B/15/61 |
| WO | WO 9526025 A1 | * | 9/1995 | ........... G11B/5/10 |

OTHER PUBLICATIONS

"Rotating Magnetic Head With Differential Air Bearings For Tape Support," Jan. 1, 1980, IBM Technical Disclosure Bulletin, vol. No. 22, Iss. No. 8B.*

* cited by examiner

Primary Examiner—William Klimowicz
(74) Attorney, Agent, or Firm—Jay H. Maioli

(57) ABSTRACT

A guide plate is provided along the respective outer periphery of rotary and fixed drums on the upstream side relative to an inlet portion where a magnetic tape starts making contact with a magnetic head on the rotary drum, an airflow attendant on the rotation of the rotary drum is stripped by a wedge-shaped edge on the guide plate and is released to the outer periphery side by a guide surface of the guide plate, and the airflow flowing in the axial direction into the space between the tape and the rotary drum is restrained by an extended portion of the guide plate. In a rotary head drum device for a magnetic recording/reproducing apparatus, formation of an excess air film near an inlet portion of the tape is restrained, and stable recording and reproducing can be achieved without raising the tape tension, thereby enhancing the life of the tape.

14 Claims, 5 Drawing Sheets

F I G. 4
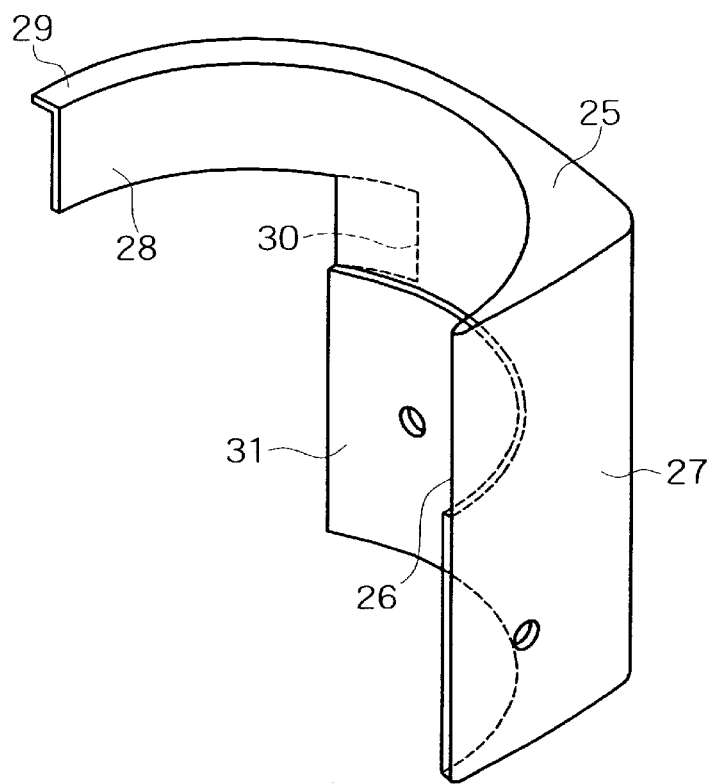
F I G. 5
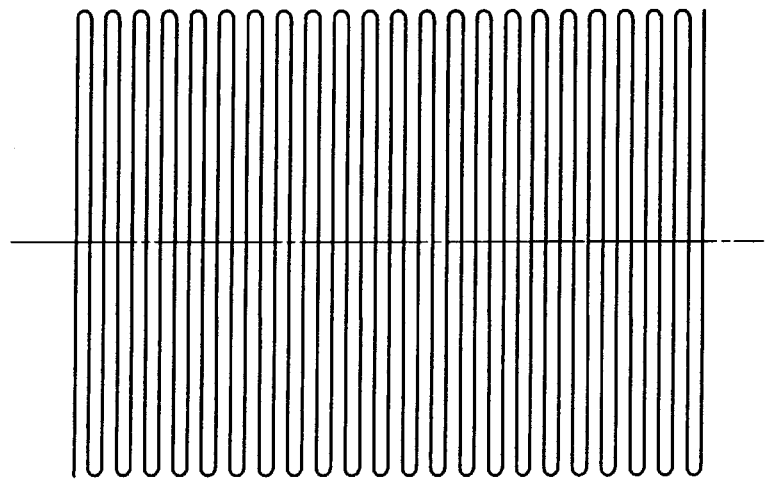

MAGNETIC RECORDING/REPRODUCING APPARATUS AND ROTARY HEAD DRUM DEVICE

BACKGROUND OF THE INVENTION

The present invention relates to a recording/reproducing apparatus and a rotary head drum device, and particularly to a recording/reproducing apparatus and a rotary head drum device in which recording and/or reproducing is performed by winding a tape shaped recording medium around the periphery of a rotary drum and bringing a head fitted to the rotary drum into contact with the tape shaped recording medium.

Helical scan type recording/reproducing apparatuss are widely used as a VTR (Video Tape Recorder) or a data tape recorder. Such a recording/reproducing apparatus includes a rotary drum and a fixed drum, and a magnetic head is so fitted as to front on the outer peripheral surface of the rotary drum. A magnetic tape is helically wound around the outer peripheral surfaces of the rotary drum and the fixed drum, and the rotary drum is rotationally driven, whereby the magnetic head scans skewly on the magnetic tape. According to such a helical scan type recording/reproducing apparatus, mutually parallel tracks are sequentially formed on the magnetic tape in a direction inclined relative to the longitudinal direction of the magnetic tape, and recording and/or reproducing of signals is performed by such tracks.

FIG. 7 shows a major portion of such a helical scan type recording/reproducing apparatus, in which a pair of magnetic heads 2 are fitted to a rotary drum 1, for example, at positions spaced apart by 180 degrees in the circumferential direction. A roller guide 3 and an inclined guide 4 are disposed on the inlet side for introducing a magnetic tape 7, and a roller guide 5 and an inclined guide 6 are disposed on the outlet side of the magnetic tape 7.

In such an arrangement, the magnetic tape 7 is slowly fed in sliding contact on the outer periphery side of the rotary drum 1 while being guided by the roller guide 3 and the inclined guide 4, and is taken out of the rotary drum 1 by the inclined guide 6 and the roller guide 5. With the rotary drum 1 rotated, the magnetic head 2 is brought into sliding contact with the magnetic tape 7, and writing or reading of signals is performed by application of the principle of magnetic induction or the principle of electromagnetic induction.

In the helical scan type recording/reproducing apparatus using such a rotary drum 1, the rotary drum 1 is driven to rotate counterclockwise, namely, in the same direction as the feeding direction of the magnetic tape 7 as shown in FIG. 7. At this time, air is taken in as indicated by arrow 8 by the outer peripheral surface of the rotary drum 1, and the air penetrates into the space between the rotary drum 1 and the magnetic tape 7, forming an air film. Here, when the amount of the air is large, the magnetic tape 7 is swollen largely to the outer periphery side on the downstream side of the inclined guide 4 at the point where the magnetic tape 7 starts making contact with the magnetic head 2, as indicated by the two-dotted chain line in FIG. 7.

FIG. 8 shows the variation in the thickness of an air film formed between the outer peripheral surface of the rotary drum 1 and the magnetic tape 7 by the airflow indicated by arrow 8, from the inlet side to the outlet side of the magnetic tape 7. As is clear from the graph, the thickness of the air film is particularly large on the inlet side of the magnetic tape 7. Due to the large thickness value, the magnetic head 2 and the magnetic tape 7 are spaced apart largely from each other at the inlet side portion of the magnetic tape 7, so that the RF output waveform is lowered than a sufficient value at the starting side portion, as shown in FIG. 6.

In order to dissolve the lowering of the output due to taking-in of airflow 8 attendant on the rotation of the rotary drum 1, Japanese Patent Laid-open No. 2000-132890 discloses an apparatus in which an outer peripheral surface of the rotary drum 1 is provided with a plurality of grooves in the circumferential direction. Alternatively, Japanese Patent Laid-open No. 2000-251352 discloses an apparatus in which an air guide is skewly provided in the vicinity of the inclined guide 4 in proximity to the outer peripheral surface of the rotary drum 1.

The problem of floating of the magnetic tape 7 to the outer periphery side due to the airflow 8 mentioned above is rarely generated where the rotational speed of the rotary drum 1 is low. In addition, the floating to the outer periphery side can be prevented by giving a sufficient tension to the magnetic tape 7. In this case, therefore, it is needless to restrain the flowing-in of the airflow 8. When the rotational speed of the rotary drum 1 is raised in order to achieve a high transfer rate, however, the amount of floating of the magnetic tape on the inlet side increases, and this phenomenon cannot be dissolved by tape tension. This is because of the problem that the life of the magnetic tape is lowered when tape tension is raised under the condition where the rotational speed is high.

Therefore, it is necessary to lower the tape tension. Where the tape tension is low, the floating cannot be restrained by simply providing the outer peripheral surface of the rotary drum 1 with the grooves as disclosed in Japanese Patent Laid-open No. 2000-132890. An apparatus having a propeller type or an intermediate drum rotation type of drum construction in place of the combination of a rotary drum and a fixed drum is somewhat advantageous against the above-mentioned problems, but such an approach leads to a rise in cost on the construction basis or worsening of assemblability. Besides, such an approach is poor in reworkability, and is unsuitable for positive adoption.

An apparatus of providing a guide plate skewly at a position on the direct downstream side of an inlet-side inclined guide as disclosed in Japanese Patent Laid-open No. 2000-251352 suffers the problem that the air pressure at the portion on the upstream side of the guide plate is locally abnormally raised since the air taken in by the rotary drum is compressed by the guide plate. Besides, there is the problem that the air has a negative pressure at a position on the downstream side of the guide plate, so that it is impossible to stably control the air film.

SUMMARY OF THE INVENTION

The present invention has been made in view of the above-mentioned problems. Accordingly, it is an object of the present invention to provide a recording/reproducing apparatus and a rotary head drum device in which it is possible to reduce the thickness of the air film at the portion on the inlet side of a tape shaped recording medium and to control the thickness of the air film to be substantially uniform.

In accordance with one aspect of the present invention, there is provided a recording/reproducing apparatus, together with a rotary head drum device therefor, for performing recording and/or reproducing by winding a tape shaped recording medium around the periphery of a rotary drum and bringing one or more heads fitted to the rotary drum into contact with the tape shaped recording medium, wherein a guide plate is provided for restraining air flowing along the rotational direction of the rotary drum around the periphery of the rotary drum on the upstream side with respect to the rotational direction of the rotary drum in relation to the position where the head and the tape shaped recording medium start making contact with each other.

Here, an edge of the guide plate on the upstream side with respect to the rotational direction of the rotary drum may strip the airflow flowing in the rotational direction of the rotary drum and may release the stripped airflow to the side of the outer periphery. Of the guide plate, the edge on the upstream side with respect to the rotational direction of the rotary drum may be wedge-shaped, and the outer peripheral surface may be a guide surface for releasing the air. In addition, the guide plate may be provided with an extended portion for controlling the airflow flowing into the space between the outer peripheral surface of the rotary drum and the tape shaped recording medium via an end face of the rotary drum. Besides, the extended portion may be provided on an outside surface thereof with a rib for preventing vibration.

According to the recording/reproducing apparatus and the rotary head drum device, by restraining the airflow flowing into the space between the rotary drum and the tape shaped recording medium attendant on the rotation of the rotary drum, it is possible to largely reduce the thickness of the air film particularly at an inlet portion, and to make substantially uniform the thickness of the air film along the rotational direction of the rotary drum, whereby electromagnetic conversion efficiency particularly at the inlet portion can be prevented from being lowered.

In accordance with another aspect of the present invention, there is provided a recording/reproducing apparatus, together with a rotary head drum device therefor, including a rotary drum to which a head is fitted, and a fixed drum whose outer peripheral side is a guide surface for a tape shaped recording medium, the rotary drum and the fixed drum being combined so as to coaxially overlap with each other, and recording and/or reproducing being performed by helically winding the tape shaped recording medium around the outer peripheries of the rotary drum and the fixed drum and scanning the head fitted to the rotary drum on the tape shaped recording medium, wherein a guide plate is provided for restraining both an airflow caused to flow into the space between the rotary drum and the tape shaped recording medium by the rotation of the rotary drum and an airflow flowing into the space between the rotary drum and the tape shaped recording medium via an end face of the rotary drum and a side end of the tape shaped recording medium.

Here, the guide plate may be fixed on an outer peripheral portion of the rotary drum. The gap between the guide plate and the rotary drum is preferably in the range of 0.1 to 2 mm.

According to the recording/reproducing apparatus and the rotary head drum device, it is possible to restrain by the guide plate both the air introduced flowingly in the circumferential direction attendant on the rotation of the rotary drum and the air introduced into the space between the rotary drum and the tape shaped recording medium via an end face of the rotary drum, whereby evening of the air film along the rotational direction of the rotary drum is achieved.

The above arrangement contributes largely to stabilization of the air film, particularly in the case where the rotary drum is rotated at high speed, and it becomes unnecessary to increase needlessly the tape tension of the tape shaped recording medium, whereby elongation of the useful life of the tape shaped recording medium is contrived.

In a preferred mode of the present invention, a guide plate ranging from the surface of the rotary drum to an upper portion at a portion on the upper side of an upper-side edge of the tape shaped recording medium is provided at a surface portion of the rotary drum up to the vicinity of an inlet for the tape shaped recording medium where the head and the tape shaped recording medium start making contact with each other, in a portion on the rear side of the rotary drum disposed on the fixed drum where the rotary drum does not make contact with the tape shaped recording medium, and in the range from the inlet to about 60 degrees in the winding direction of the tape; by the guide plate, the airflow engulfed into the space between the rotary drum and the tape shaped recording medium by the rotation of the rotary drum is restrained In a rotary drum having a large-diameter and high-speed rotation type rotary drum not lower than the VHS specification with a diameter of 62 mm. in the case where the rotational speed is not less than 5000 rpm, relative velocity to a magnetic tape is not less than 16 m/sec and the tension of the tape shaped recording medium is not more than 20 g, the air film at the tape inlet of the rotary drum becomes too thick in the radial direction of the rotary drum, so that it is difficult to restrain the air film by simply providing the outer peripheral surface of the rotary drum with more circumferential grooves or deepening the grooves.

However, with the guide plate according to the above mentioned embodiment, it is made possible to restrain at least the airflow penetrating to the lower side of the tape shaped recording medium wound around the rotary drum and the airflow engulfed to the surface of the rotary drum by a centrifugal force via an upper-side end face of the rotary drum, thereby largely contributing to restraining of the problem of the air film particularly at a high-speed rotation. In addition, the air film is made substantially uniform along the longitudinal direction of the tape shaped recording medium, and contact of the tape shaped recording medium particularly at the inlet-side portion is improved, so that it is possible to obtain an ideal RF waveform as shown in FIG. 5.

BRIEF DESCRIPTION OF THE DRAWINGS

FIG. 4 is a perspective view of the guide plate as viewed from the inner side;

FIG. 5 is a waveform diagram of an RF output waveform;

DESCRIPTION OF THE PREFERRED EMBODIMENTS

Figure 1:
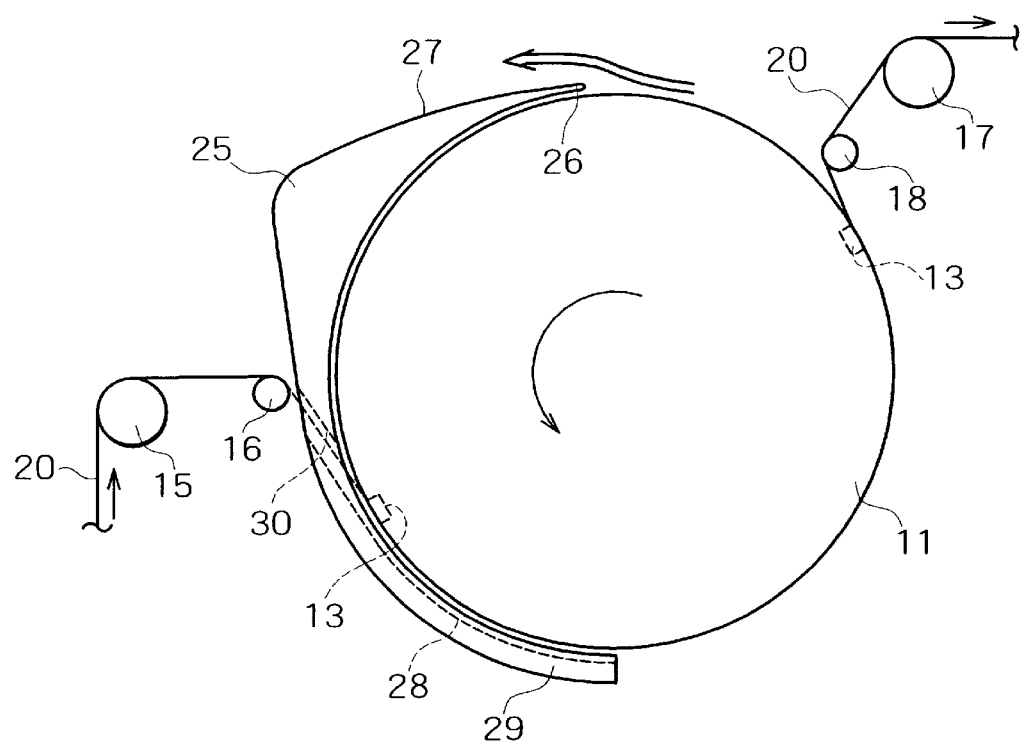
FIG. 1 is a plan view of a major portion of a recording/reproducing apparatus.
Figure 2:
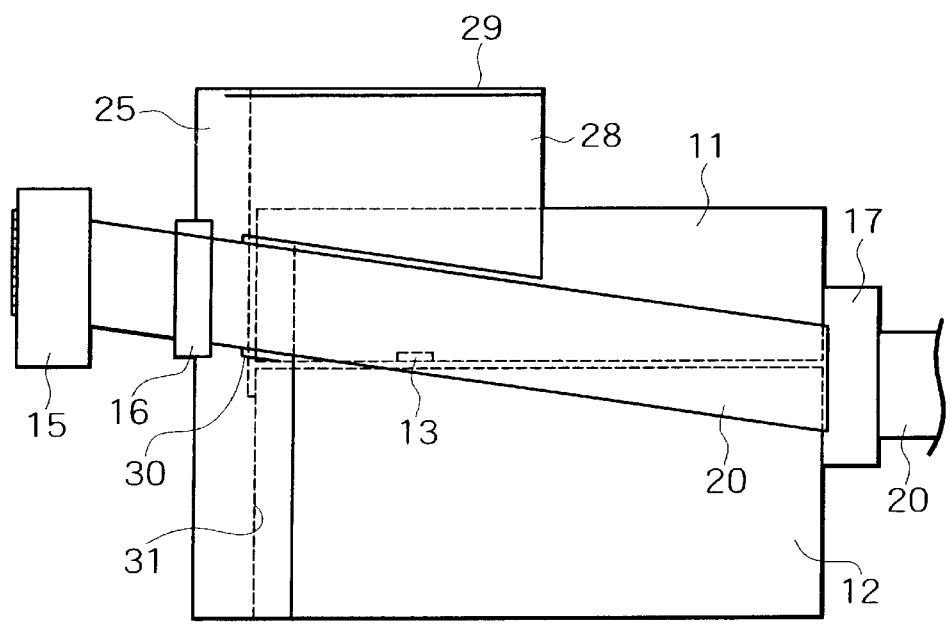
FIG. 2 is a front view of the same.

FIGS. 1 and 2 show particularly a rotary head drum device constituting a major part of a recording/reproducing apparatus according to one embodiment of the present invention. The rotary head drum device includes a rotary drum 11 and a fixed drum 12, which are so disposed as to coaxially overlap with each other on the upper and lower sides as shown in FIG. 2. A pair of magnetic heads 13 are fitted to the rotary drum 11, for example, at positions staggered from each other by 180 degrees in the circumferential direction.

A roller guide 15 and an inclined guide 16 are provided at an inlet-side portion of the rotary drum 11. A roller guide 17 and an inclined guide 18 are provided at an outlet-side portion. A magnetic tape 20 is helically wound around the outer peripheral surfaces of the rotary drum 11 and the fixed drum 12 so as to be guided by the guides 15 to 18. The magnetic heads 13 are brought into contact with the magnetic tape 20 to perform helical scan type recording and reproducing.

Figure 3:
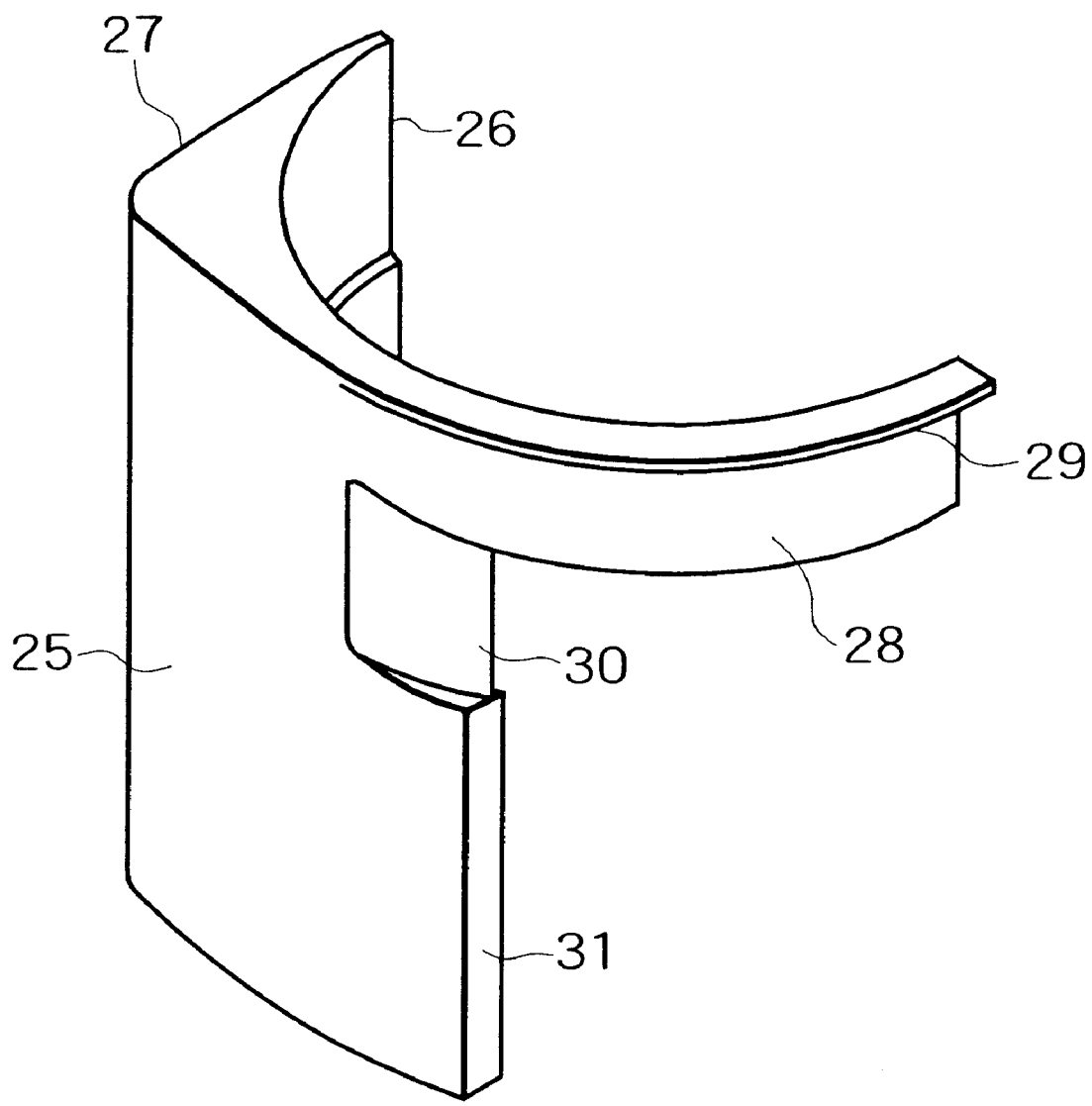
FIG. 3 is a perspective view of a guide plate.

Particularly, a large characteristic feature of the recording/reproducing apparatus lies in that a guide plate 25 is used for effectively controlling the amount of the air film formed between the rotary drum 11 and the magnetic tape 20. As shown in FIGS. 3 and 4, the guide plate 25 is provided with a wedge-shaped edge 26 disposed on the upstream side with respect to the rotational direction of the rotary drum 11, and the wedge-shaped edge 26 strips air flowing along the rotational direction of the rotary drum around the periphery of the rotary drum 11. A guide surface 27 for guiding the stripped airflow is provided on the outside surface of the guide plate 25 on the rear side of the wedge-shaped edge 26.

The guide plate 25 includes an extended portion 28 extended to the downstream side with respect to the rotational direction of the rotary drum 11 particularly. As shown in FIG. 2, the extended portion 28 covers the outer peripheral surface of the rotary drum 11 from the outer side in the condition of being disposed on the upper side of the upper-side edge of the magnetic tape 20, and has the function of restraining the air penetrating into the space between the outer peripheral surface of the rotary drum 11 and the magnetic tape 20 particularly via an upper-side end face of the rotary drum 11 under a centrifugal force. The extended portion 28 is provided with a rib 29 for restraining vibration thereof. On the base side of the extended portion 28, an introducing recessed portion 30 is provided for preventing the magnetic tape 20 from interfering with the guide plate 25. The guide plate 25 is provided on the inside surface thereof with a fitting stepped portion 31, by which the guide plate 25 is fixed on the outer peripheral surface of the fixed drum 12.

The guide plate 25 may be molded from a synthetic resin such as ABS resin and Delrin, and may have an integral structure. The radial gap or clearance between the inner peripheral side portion of the guide plate 25 and the outer peripheral portion of the rotary drum 11 is preferably in the range of 0.1 to 2.0 mm, particularly 0.3 to 1.0 mm. In this embodiment, the clearance was set to be about 0.5 mm.

In such an arrangement, as shown in FIGS. 1 and 2, the rotary drum 11 is rotated at a high speed by a motor (not shown) in the condition where the magnetic tape 20 is helically wound around the outer peripheral surfaces of the rotary drum 11 and the fixed drum 12 by the guides 15 to 18, and the magnetic tape 20 is slowly fed in the rotational direction of the rotary drum 11. Then, the magnetic heads 13 provided on the rotary drum 11 scan skewly on the magnetic tape 20. Signals are written on the magnetic tape 20 through magnetic induction by the magnetic head 13. Besides, signals recorded on the magnetic tape 20 are read by the magnetic head 13 through the principle of magnetic induction. In such operations, recording and/or reproducing of signals on the magnetic tape 20 is carried out.

In the rotary head drum device performing such recording and reproducing, air flows on the outer peripheral surface of the rotary drum 11 in the rotational direction attendant on the high-speed rotation of the rotary drum 11. However, the air is stripped by the wedge-shaped edge 26 disposed on the upstream side with respect to the rotational direction of the rotary drum 11, of the guide plate 25 disposed on the outer peripheral side of the rotary drum 11. The stripped air is guided to the outer periphery side along the guide surface 27 on the back side of the guide plate 25. Accordingly, the quantity of air film at the position where the magnetic tape 20 and the rotary drum 11 start making contact with each other is prevented from being particularly enlarged extremely as compared with that at other portions.

The guide plate 25 is provided with the extended portion 28 extended to the downstream side with respect to the rotational direction of the rotary drum 11 in relation to the position where the magnetic tape 20 and the rotary drum 11 start making contact with each other. The extended portion 28 covers the region on the upper side of an upper-side edge of the magnetic tape 20, of the outer peripheral surface of the rotary drum 11. The extended portion 28 displays the function of restraining the airflow introduced from the upper end face of the rotary drum 11 onto the outer peripheral surface of the rotary drum 11 by the centrifugal force attendant on the rotation of the rotary drum 11. Therefore, air flowing into the space between the outer peripheral surface of the rotary drum 11 and the magnetic tape 20 via the upper-side side end surface of the magnetic tape 20 is restrained.

Figure 6:
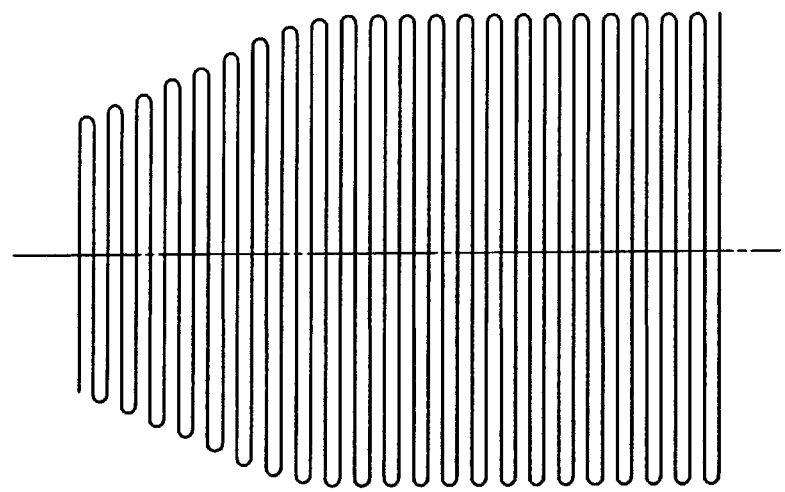
FIG. 6 is a waveform diagram of an RF output waveform of a recording/reproducing apparatus according to the related art.
Figure 7:
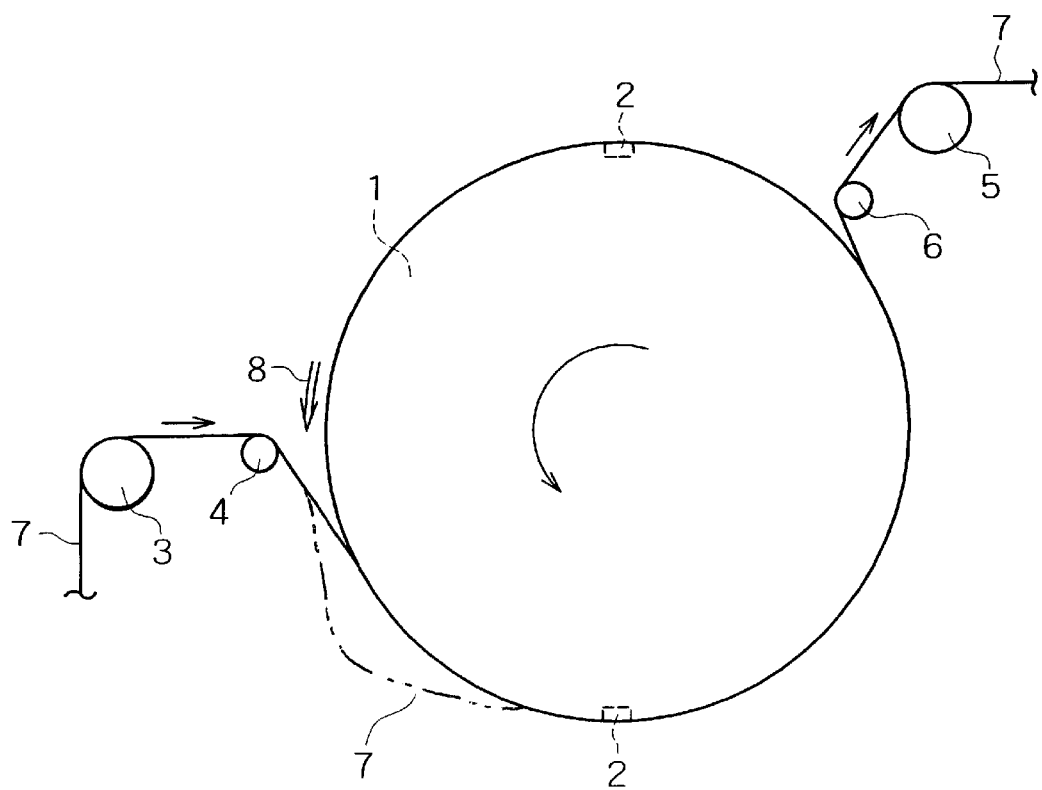
FIG. 7 is a plan view of a major portion of a recording/reproducing apparatus according to the related art.
Figure 8:
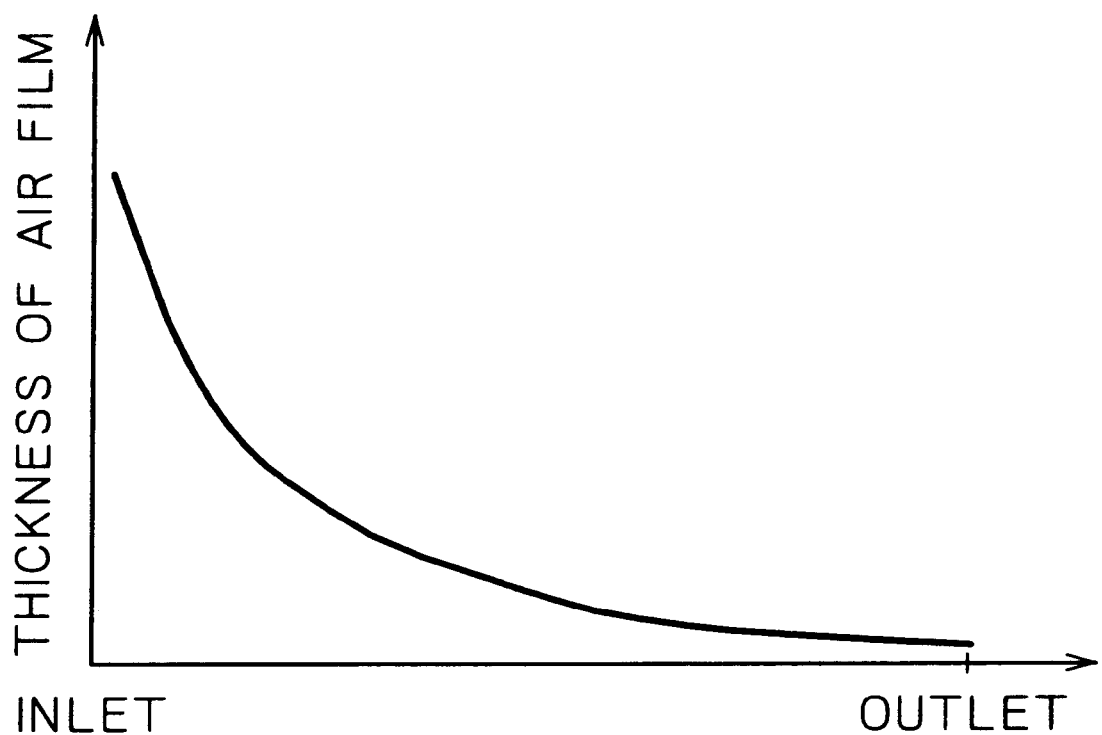
FIG. 8 is a graph showing the variation of thickness of an air film in the apparatus.

By the stripping of the airflow by particularly the wedge-shaped edge 26 of the guide plate 25 and by the prevention of the flowing-in of airflow from the upper side performed by the extended portion 28, the quantity of the air film generated between the magnetic tape 20 and the rotary drum 11 can be made to be a substantially fixed value along the circumferential direction of the rotary drum 11 and, hence, along the longitudinal direction of the magnetic tape 20. Accordingly, the distance between the magnetic tape 20 and the magnetic head 13 is always substantially constant. Therefore, the electromagnetic conversion efficiency is fixed along the rotational direction of the rotary drum 11, or along the feeding direction of the magnetic tape 20. Accordingly, an RF output waveform becomes an ideal shape as shown in FIG. 5, and lowering and variation of the output particularly at the start portion are obviated. This fact is apparent from comparison of FIG. 5 with FIG. 6. In addition, it is unnecessary to raise the tape tension for making uniform the quantity of air film, so that elongation of useful life of the magnetic tape 20 can be contrived.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A magnetic recording and reproducing apparatus for performing recording and reproducing by winding a tape-shaped recording medium around a periphery of a rotary drum and bringing at least one head fitted to the rotary drum into contact with the tape-shaped recording medium, wherein a guide plate is provided for restraining air flowing along a rotational direction of the rotary drum around the periphery of the rotary drum on an upstream side with respect to the rotational direction of the rotary drum in relation to a position where the head and the tape-shaped recording medium start making contact, and wherein the guide plate is provided with an extended portion extending in a downstream direction for controlling the air flowing from an upper side of the rotary drum into a gap between an outer peripheral surface of the rotary drum and the tape-shaped recording medium via an end face of the rotary drum.

2. The magnetic recording and reproducing apparatus according to claim 1, wherein an edge of the guide plate on the upstream side with respect to the rotational direction of the rotary drum strips the air flowing in the rotational direction of the rotary drum and releases the stripped air to the periphery.

3. The magnetic recording and reproducing apparatus according to claim 2, wherein the edge of the guide plate on the upstream side with respect to the rotational direction of the rotary drum is wedge-shaped and an outer peripheral surface is a guide surface for releasing the air.

4. The magnetic recording and reproducing apparatus according to claim 1, wherein the extended portion is provided on an outside surface of the guide plate with a rib extending in a circumferential direction of the rotary drum for preventing vibration of the extended portion.

5. A magnetic recording and reproducing apparatus comprising a rotary drum to which at least one head is fitted and a fixed drum whose outer peripheral side is a guide surface for a tape-shaped recording medium, the rotary drum and the fixed drum being combined so as to coaxially overlap and recording and reproducing being performed by helically winding the tape-shaped recording medium around an outer periphery of the rotary drum and an outer periphery of the fixed drum and scanning the head fitted to the rotary drum on the tape-shaped recording medium, wherein a guide plate is provided for restraining both air caused to flow into a space between the rotary drum and the tape-shaped recording medium by a rotation of the rotary drum and air flowing into the space between the rotary drum and the tape-shaped recording medium via an end face of the rotary drum and a side end of the tape-shaped recording medium, and wherein the guide plate is provided with an extended portion extending in a downstream direction for controlling the air flowing from an upper side of the rotary drum into a gap between an outer peripheral surface of the rotary drum and the tape-shaped recording medium via an end face of the rotary drum.

6. The magnetic recording and reproducing apparatus according to claim 5, wherein the guide plate is fixed on an outer peripheral portion of the fixed drum.

7. The magnetic recording and reproducing apparatus according to claim 5, wherein a gap between said guide plate and the rotary drum is 0.1 to 2.0 mm.

8. A rotary head drum device for use in a magnetic recording and reproducing apparatus comprising a rotary drum having at least one head, recording and reproducing being performed by winding a tape-shaped recording medium around a periphery of the rotary drum and bringing the head fitted to the rotary drum into contact with the tape-shaped recording medium, wherein a guide plate is provided for restraining air flowing along a rotational direction of the rotary drum around a periphery of the rotary drum on an upstream side with respect to the rotational direction of the rotary drum in relation to a position where the head and the tape-shaped recording medium start making contact, and wherein the guide plate is provided with an extended portion extending in a downstream direction for controlling the air flowing from an upper side of the rotary drum into a space between an outer peripheral surface of the rotary drum and the tape-shaped recording medium via an end face of the rotary drum.

9. The rotary head drum device according to claim 8, wherein an edge of the guide plate on the upstream side with respect to the rotational direction of the rotary drum strips the air flowing in the rotational direction of the rotary drum and releases the stripped air to the periphery.

10. The rotary head drum device according to claim 9, wherein the edge of the guide plate on the upstream side with respect to the rotational direction of the rotary drum is wedge-shaped and an outer peripheral surface is a guide surface for releasing the air.

11. The rotary head drum device according to claim 8, wherein the extended portion is provided on an outside surface of the guide plate with a rib extending in a circumferential direction of the rotary drum for preventing vibration of the extended portion.

12. A rotary head drum device comprising a rotary drum having at least one head and a fixed drum that is provided on an outer peripheral surface of the rotary drum with a guide surface for a tape-shaped recording medium brought into contact with the head and that is disposed coaxially with the rotary drum, wherein a guide plate is provided for restraining air flowing along a rotational direction of the rotary drum around a periphery of the rotary drum on an upstream side with respect to a rotational direction of the rotary drum in relation to a position where the head and the tape-shaped recording medium start making contact, and wherein the guide plate is provided with an extended portion extending in a downstream direction for controlling the air flowing from an upper side of the rotary drum into a space between an outer peripheral surface of the rotary drum and the tape-shaped recording medium via an end face of the rotary drum.

13. The rotary head drum device according to claim 12, wherein the guide plate is fixed on an outer peripheral portion of the fixed drum.

14. The rotary head drum device according to claim 12, wherein a gap between the guide plate and the rotary drum is 0.1 to 2.0 mm.

* * * * *